June 10, 1924.
P. BURKE
EXCAVATING SHOVEL
Filed Jan. 2, 1923
1,496,976
2 Sheets-Sheet 2
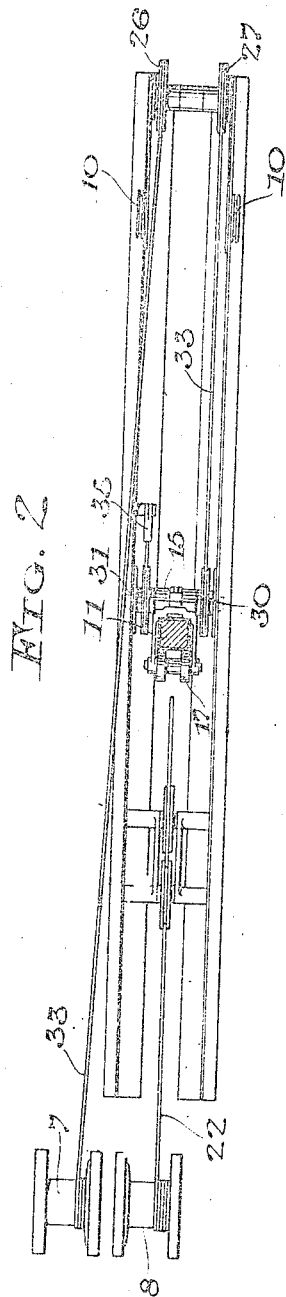
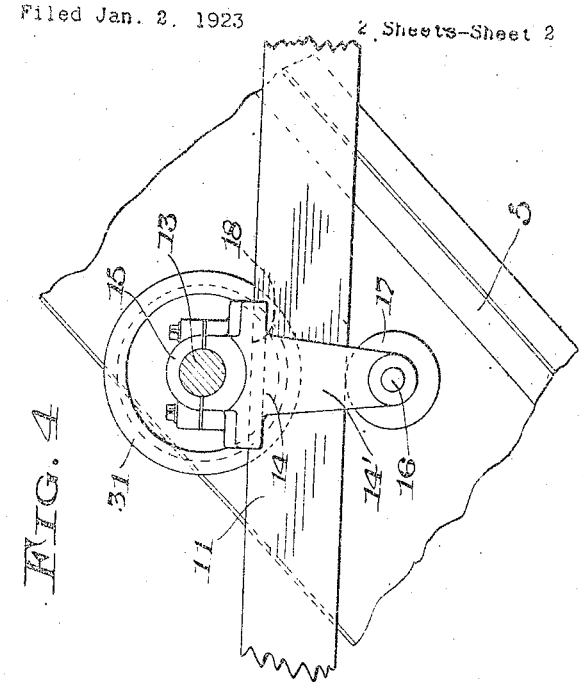
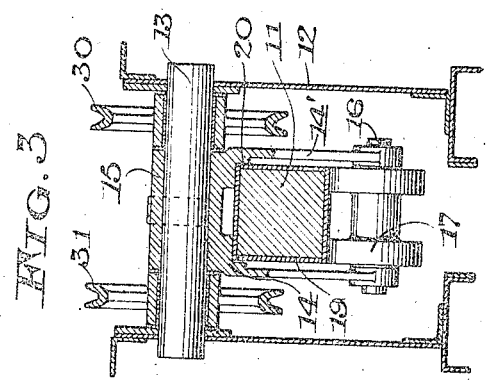
WITNESSES
INVENTOR
Paul Burke
ATTORNEY Patented June 10, 1924.

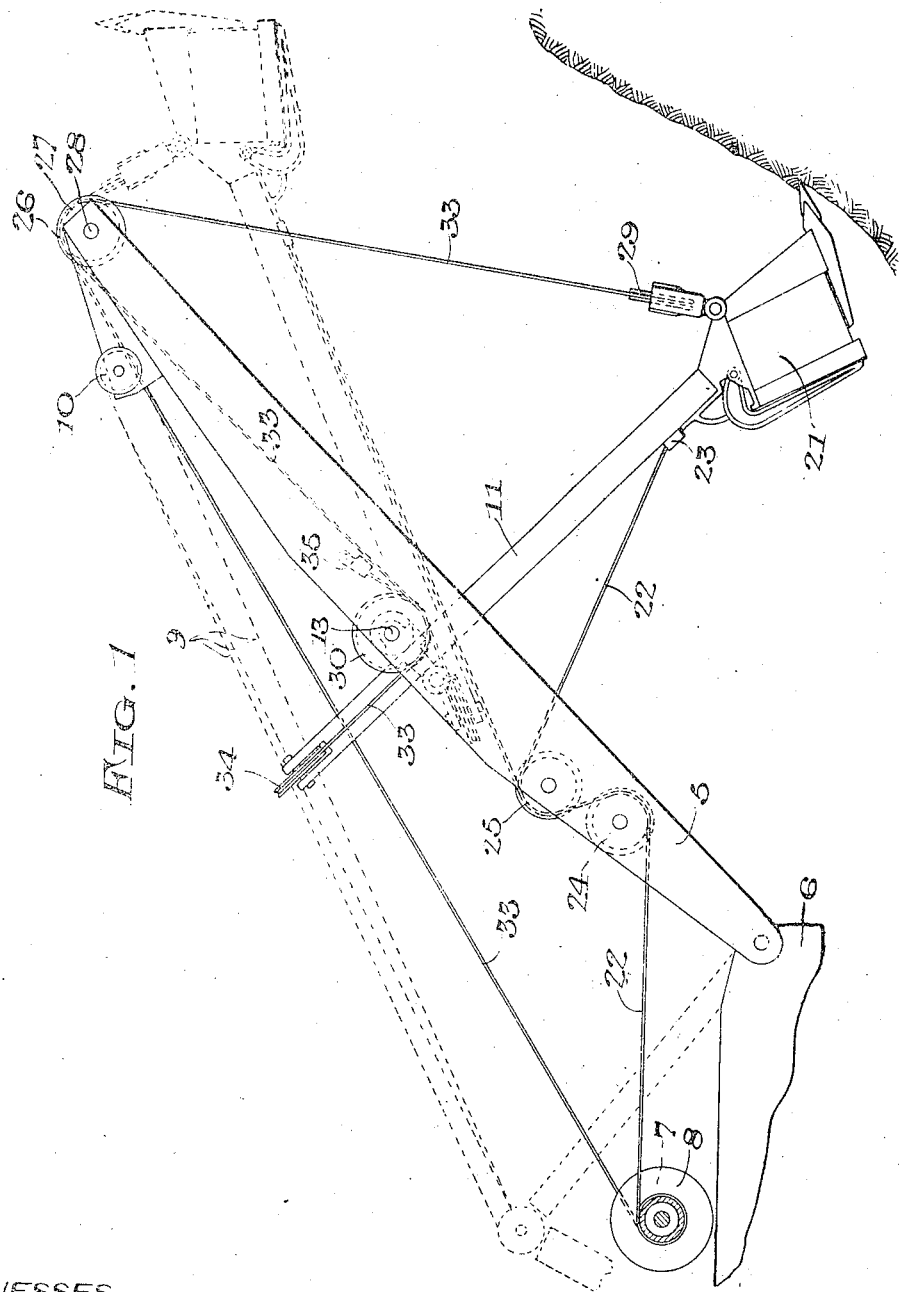

1,496,976

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

EXCAVATING SHOVEL.

Application filed January 2, 1923. Serial No. 610,193.

*To all whom it may concern:*

Be it known that I, PAUL BURKE, a citizen of the United States, and resident of Green Bay, in the county of Brown and State of Wisconsin, have invented a new and useful Improvement in Excavating Shovels, of which the following is a specification.

This invention relates to power-shovels, and more particularly to that type of shovel in which the hoisting-rope or cable is used to actuate the thrust mechanism.

One of the objects of the invention is to improve and simplify power-shovels of the rope-thrusting type and to provide for thrusting of the dipper handle without the usual gear mechanism or rack and pinions, or auxiliary driving apparatus of any kind, and to arrange the ropes or lines for controlling the dipper so as to avoid the use of drums and to minimize wear.

A further object of the invention is to provide a novel construction of guiding mechanism for the dipper handle.

The invention further consists in the several features hereinafter set forth and more particularly defined by claims at the conclusion hereof.

In the drawings:

Fig. 1 is a side elevation of a power-shovel embodying the invention; Fig. 2 is a plan view thereof, partly in section; Fig. 3 is a sectional view through the shipper-shaft and stick-guiding mechanism; Fig. 4 is an enlarged side view of the stick-guiding mechanism.

In the drawings the numeral 5 designates the boom, which may be of any suitable construction, vertically pivotally attached at its lower end to a rotating base 6 of the machine, said base being of well-known construction.

A hoisting drum 7 and an auxiliary drum 8 are mounted on the base 6 in any suitable manner and driven from the prime mover (not shown) on the base. The drums 7 and 8 may be of any well-known construction equipped with clutches and brakes to control their operation, and the drum 8 is preferably substantially centered with respect to the longitudinal axis of the boom for purpose hereinafter described. The boom is adapted to be raised or lowered in various positions of vertical adjustment by any well-known means, such as a cable 9, shown in dotted lines, connecting pulleys 10 at the outer end of the boom to parts on the rotating base. The boom shown is of the plate-girder type with the dipper handle or stick 11 working between its sides 12.

The shipper shaft 12 is secured to opposite sides of the boom and the guiding means for the stick is loose on said shaft and preferably swings behind said shaft. This guiding means consists of a two-part saddle-block 14—15, the part 14 being clamped to the shaft by a bearing-cap 15, said part 14 having arms 14' carrying a shaft 16 on which a guide-roller 17 is loosely mounted. The stick 11 slides between the flat surface 18 of the saddle-block immediately adjacent the shaft 13 and the roller 17 and may have a metal covering 19. The saddle has shouldered portions 20 adjacent the flat surface 18 so as to prevent transverse movement of the stick in the guide. The dipper or shovel 21 carried by the stick may be of any suitable construction. The inward-thrusting cable 22 is connected to the drum 8 and directly to the dipper and dipper handle, as at 23, and is guided intermediate its ends by sheaves 24 and 25, the lower sheave 24 insuring proper guiding of the cable 22 over the sheave 25 irrespective of the position of the stick and the elevation of the boom. The cable run over pulleys 24 and 25 is substantially alined with the drum and with the dipper stick so as to minimize wear, and in this case the inward-thrusting cable extends at an angle to the stick.

Spaced sheaves 26 and 27 are mounted on a shaft 28 at the outer end portion of the drum and a padlock sheave 29 is mounted on the dipper transverse or at right angles to the axis of the sheaves 27 and 28. Sheaves 30 and 31 are loosely mounted on the shipper shaft 13 at opposite sides of the saddle-block. The hoisting and thrusting cable 33 extends over the drum 7, over the sheave 27, around the padlock sheave 29, over the sheave 28, around the sheave 30 and over a sheave 34 at the upper end of the stick and having its axis disposed transverse or at right angles to the axis for the sheaves 30 and 31, thence over the sheave 31, and is anchored at its outer end 35 to the boom. This receiving of the cable produces a two-part line hoist portion for hoisting the dipper and a two-part line portion in end-thrust engagement with the stick for crowding the dipper, and the cable 33 has its run over the stick maintained in the same relation thereby irrespective of the angular position of the stick with respect to the boom by the sheave arrangement just described.

The arrangement above described permits the use of a single instead of a divided stick and makes it unnecessary to have a double-wrap cable.

With the construction above described, when the drum 8 is released slightly, thereby maintaining a slight tension on the cable 22 but permitting it to pay out, and the line 33 is pulled in, the dipper moves in the arc of a circle of which the shipper shaft is the center. If it is desired to crowd farther into the bank or move the dipper farther out, as in loading a wagon, the breaking effect on the line 22 is released slightly, whereupon the line 33 working over the upper end of the dipper stick, forces or thrusts the dipper stick outward. Conversely, if it is desired to move the dipper farther in and toward the boom, releasing the brake on line 33 and pulling on line 22 by the operation of drum 8 produces this effect. Thus, by the proper manipulation and control of the lines 22 and 33 through the rotation or braking of the drums 8 and 7, any desired swinging or thrusting movement of the dipper and its handle may be effected. It will also be noted that the thrusting action on the dipper is proportional to the load upon the dipper and to the resistance and weight of the material it encounters during digging.

It will be further noted that by swinging the dipper back of the shipper shaft the arrangement of the guides for said cables is facilitated and that the arrangement of the guides for said cables prevents their interference with the swinging of the dipper.

I desire it to be understood that this invention is not to be limited to any specific form or arrangement of parts except in so far as such limitations are specified in the claims.

What I claim as my invention is:

1. In a rope-thrusting shovel, the combination with the boom, of a dipper, a dipper handle, a shipper shaft, guide means for said handle comprising a saddle-block having a flat surface adjacent said shaft and a roller, said handle being mounted to slide between said surface and roller, a hoisting and thrusting cable for crowding the dipper, and means for moving the dipper handle inwardly.

2. In a rope-thrusting shovel, the combination with the boom, of a dipper and dipper handle mounted on said boom for swinging and shifting movement relative thereto, a hoisting and thrusting cable for crowding the dipper, and another cable extending from the boom to said handle for moving the dipper inwardly, and guide means for said last named cable located behind and below the axis of rotation of the dipper handle.

3. In a rope-thrusting shovel, the combination with the boom, of a shipper shaft, a dipper and a dipper handle mounted behind and below said shaft to swing and shift with respect thereto, a hoisting and thrusting cable for crowding the dipper, and another cable extending from the boom to said handle for moving the dipper inwardly, and vertically spaced guide sheaves on the boom below said shipper shaft for guiding said last-named cable.

4. In a rope-thrusting shovel, the combination with the boom, of a shipper shaft, a dipper and dipper handle mounted behind and below said shaft to swing and shift with respect thereto, a hoisting and thrusting cable for crowding the dipper, a hoisting and thrusting cable having a two-part hoist connection between the boom and dipper and a bight in end-thrust engagement with the dipper handle, and another cable extending from the boom to said handle for moving the dipper inwardly, and vertically spaced guide sheaves on the boom below said shipper shaft for guiding said last-named cable.

PAUL BURKE.